(12) United States Patent  
Grewal et al.

(10) Patent No.: US 9,076,129 B2  
(45) Date of Patent: Jul. 7, 2015

(54) METHODS AND SYSTEMS FOR MANAGING GROUP CHATS AMONG TEAM MEMBERS

(75) Inventors: Sukhminder Singh Grewal, New Haven, CT (US); Wayne Chan, New Haven, CT (US); Daniel Mark Dormont, New Haven, CT (US); Nathaniel Bjorn Ellis, New Haven, CT (US); Andrew A. Mazurek, New Haven, CT (US); Kenneth Edward Moon, Norwalk, CT (US); Tamas Simon, New Haven, CT (US)

(73) Assignee: Grey Wall Software LLC, New Haven, CT (US)

(*) Notice: Subject to any disclaimer, the term of this patent is extended or adjusted under 35 U.S.C. 154(b) by 134 days.

(21) Appl. No.: 13/588,096

(22) Filed: Aug. 17, 2012

(65) Prior Publication Data

US 2013/0046828 A1 Feb. 21, 2013

Related U.S. Application Data

(60) Provisional application No. 61/525,518, filed on Aug. 19, 2011.

(51) Int. Cl.  
G06F 15/16 (2006.01)  
G06Q 10/10 (2012.01)  
H04L 12/18 (2006.01)  
H04L 12/58 (2006.01)

(52) U.S. Cl.  
CPC .............. *G06Q 10/10* (2013.01); *G06Q 10/101* (2013.01); *G06Q 10/103* (2013.01); *H04L 12/1822* (2013.01); *H04L 51/046* (2013.01)

(58) Field of Classification Search  
CPC . H04L 12/18; H04L 12/1813; H04L 12/1818; H04L 12/1822; H04L 12/581  
USPC .................................................... 709/204, 205  
See application file for complete search history.

(56) References Cited

U.S. PATENT DOCUMENTS

| 7,072,940 | B1* | 7/2006 | Day et al. ...................... 709/204 |
| 7,509,386 | B2 | 3/2009 | Miyashita |
| 8,015,246 | B1* | 9/2011 | Anderson ..................... 709/204 |
| 8,105,246 | B2* | 1/2012 | Voeller et al. .................. 600/585 |
| 8,107,402 | B1* | 1/2012 | Everson et al. ............... 370/260 |
| 2007/0282947 | A1* | 12/2007 | Hupfer et al. ................. 709/204 |
| 2007/0288560 | A1 | 12/2007 | Bou-Ghannam et al. |
| 2008/0091692 | A1* | 4/2008 | Keith et al. ................... 707/100 |
| 2009/0157709 | A1 | 6/2009 | Kruger et al. |
| 2009/0228944 | A1* | 9/2009 | Bodlaender .................. 725/110 |
| 2010/0325214 | A1 | 12/2010 | Gupta |
| 2011/0029622 | A1 | 2/2011 | Walker et al. |

* cited by examiner

*Primary Examiner* — Duyen Doan  
(74) *Attorney, Agent, or Firm* — Armstrong Teasdale LLP

(57) ABSTRACT

A computer system for hosting electronic group chat is provided. The computer system includes a memory device for storing data and a processor coupled in communication with the memory device. The processor is programmed to electronically host a plurality of chat rooms, associate a first chat room of the plurality of chat rooms with a first element inputted into the computer system, and transmit chat communications between a plurality of users of the chat rooms.

19 Claims, 5 Drawing Sheets

METHODS AND SYSTEMS FOR MANAGING GROUP CHATS AMONG TEAM MEMBERS

CROSS-REFERENCE TO RELATED APPLICATIONS

This application claims priority to U.S. Application No. 61/525,518 filed Aug. 19, 2011, the entire disclosure of which is hereby incorporated by reference in its entirety.

BACKGROUND OF THE INVENTION

This invention relates generally to electronic group chat and, more particularly, to computer implemented methods and systems for managing electronic group chats among team members including organizing electronic communications and action items shared among team members.

Different types of communication tools have been developed to allow users to communicate over a network (e.g., the Internet, an intranet, etc.). One popular type of communication tool is electronic chat (also sometimes called instant messaging or IM). Chat allows users to communicate over a network in real time. A client program (called a chat client) is typically used to participate in chat communication.

A user typically types text in a chat client and the typed text is passed, by a chat service, to the chat client of each user in the communication (e.g., in the same chat room). Chat communication may be communication between, and only visible to, two users, multiple users, and/or groups of users.

In persistent chat, a chat room is created and made persistent, (i.e., it remains in existence even when it is not being used for a chat communication and/or no user is present in the chat room). The chat communication in a persistent chat room may remain in the chat room for a period of time after the chat communication occurred, including being retained and/or archived.

BRIEF DESCRIPTION OF THE INVENTION

In one embodiment, a computer system for group chat is disclosed. The computer system includes a memory device for storing data and a processor coupled in communication with the memory device. The processor is programmed to associate a first chat room of a plurality of chat rooms with a first element inputted into the computer system, and facilitate chat communications between a plurality of users of the chat rooms.

In another embodiment, a method of providing group chat is disclosed. The method includes associating a first chat room of a plurality of chat rooms with a first element inputted into a computer system and facilitating chat communications between a plurality of users of the chat rooms.

In still another embodiment, one or more non-transitory computer-readable storage media includes computer-executable instructions embodied thereon, wherein when executed by at least one processor, the computer-executable instructions cause the processor to associate a first chat room of a plurality of chat rooms with a first element and facilitate chat communications between a plurality of users of the chat rooms.

BRIEF DESCRIPTION OF THE DRAWINGS

FIG. 1 is a simplified block diagram of an exemplary group chat system in accordance with one embodiment of the present invention.

FIG. 2 is an expanded block diagram of an exemplary embodiment of a server architecture of the group chat system shown in FIG. 2.

FIG. 3 illustrates an exemplary configuration of a computer device operated by a user such as the client devices shown in FIGS. 1 and 2.

FIG. 4 illustrates an exemplary configuration of a server computer device such as the server system shown in FIGS. 1 and 2.

FIG. 5 is a functional block diagram of an exemplary chat system in accordance with one embodiment of the present invention.

DETAILED DESCRIPTION OF THE INVENTION

The following detailed description illustrates embodiments of the invention by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an exemplary embodiment, namely, systems and methods for managing group chats among teams of users including organizing chat communications and action items shared among team members.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present invention described herein relate to electronic group chat.

Figure 1:
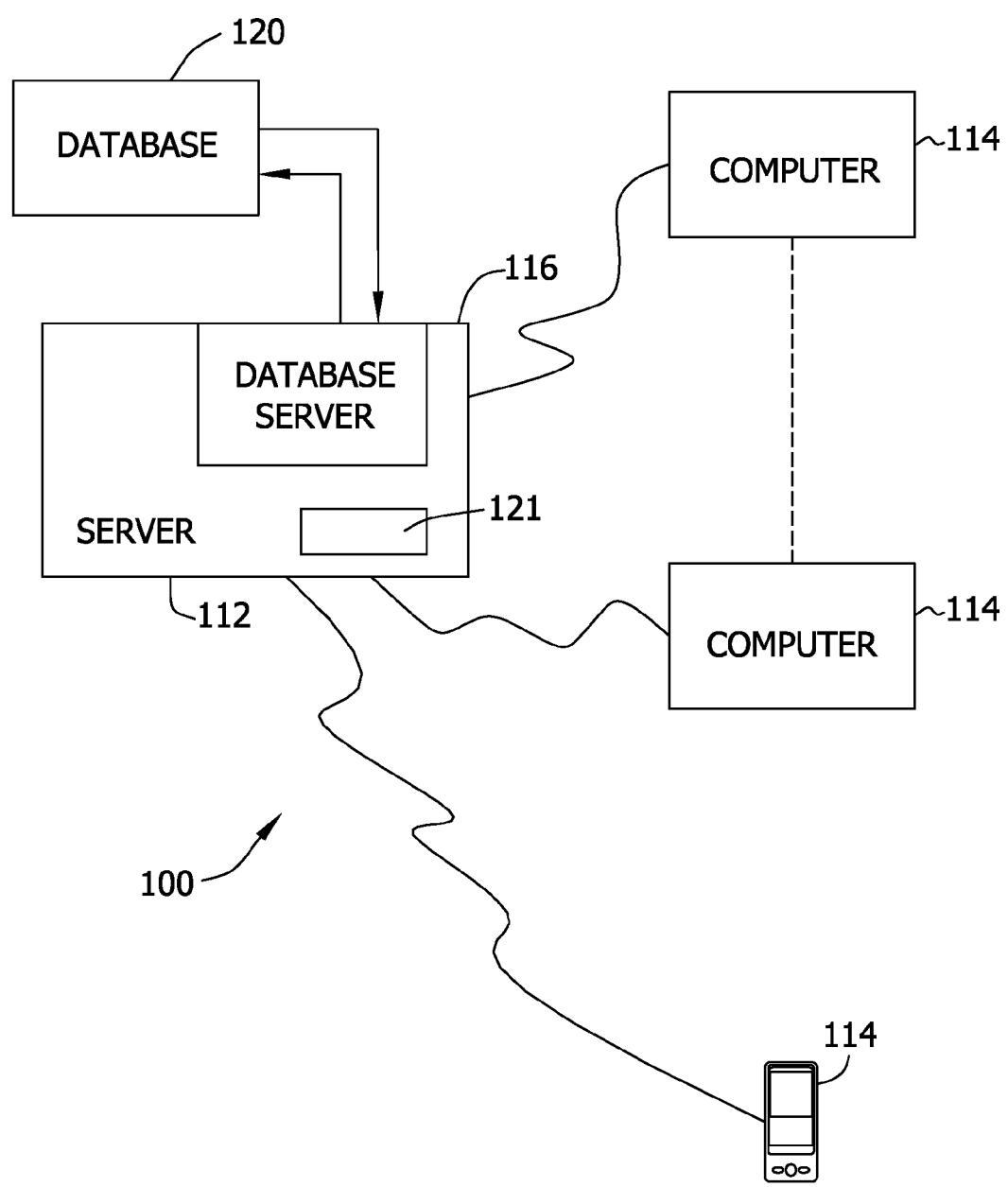
FIGS. 1-5 show exemplary embodiments of the method and system described herein.

FIG. 1 is a simplified block diagram of an exemplary chat system 100 in accordance with one embodiment of the present invention. System 100 is a chat system, which can be utilized for group chatting as described below.

More specifically, in the example embodiment, system 100 includes a server system 112, which is a type of computer system, and a plurality of client sub-systems (also referred to as client systems 114) connected to server system 112. In one embodiment, client systems 114 are computers including a web browser and/or a chat client, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

A database server 116 is connected to database 120, which contains information on a variety of matters, as described below in greater detail. In one embodiment, centralized database 120 is stored on server system 112 and can be accessed by logging onto server system 112 through one of client systems 114. In an alternative embodiment, database 120 is stored remotely from server system 112 and may be non-centralized. Database 120 may store chat configuration settings, task data, profile data, archived chats, template chats, chat data, etc.

Figure 2:
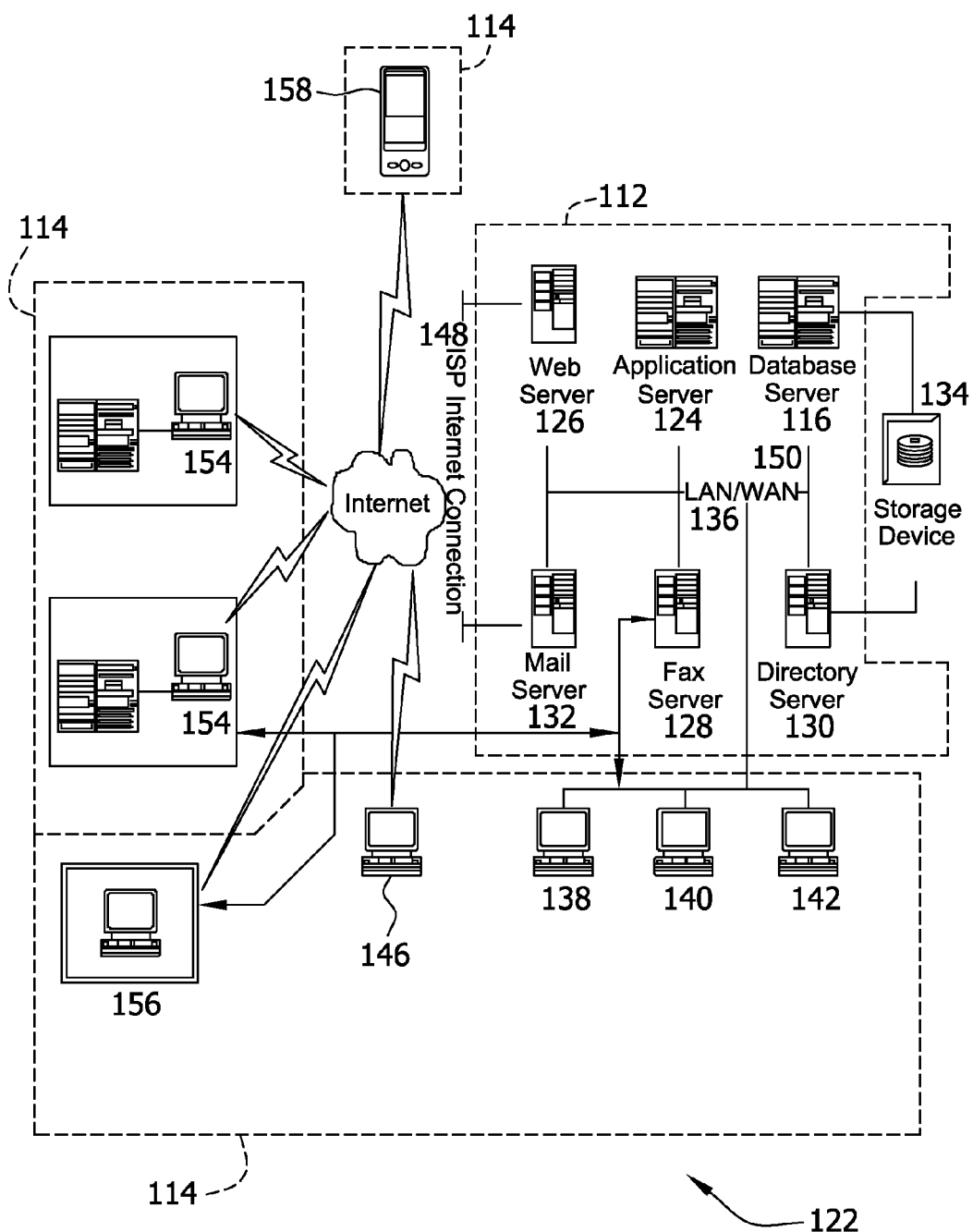

FIG. 2 is an expanded block diagram of an exemplary embodiment of a server architecture of a chat system 122 in accordance with one embodiment of the present invention. Components in system 122, identical to components of system 100 (shown in FIG. 1), are identified in FIG. 2 using the same reference numerals as used in FIG. 2. System 122 includes server system 112 and client systems 114. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. Workstations 138, 140, and 142 are coupled to LAN 136. Alternatively, workstations 138, 140, and 142 are coupled to LAN 136 using an Internet link or are connected through an Intranet. Workstations 146 and 156 are coupled to LAN 136 using an Internet link. Similarly, workstations 154 and mobile device 158 can access system 122 using via the Internet.

Each workstation, 138, 140, 142, 146, and 154 is a personal computer having a web browser. Although the functions performed at the workstations typically are illustrated as being performed at respective workstations 138, 140, 142, 146 and 154 such functions can be performed at one of many personal computers coupled to LAN 136.

Server system 112 is configured to be communicatively coupled to various individuals using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a mobile device 158 can access system 122. Mobile device 158 is a mobile phone. Alternatively, mobile device 158 may be a PDA or other mobile device. Also, mobile device 158 is configured to communicate with server system 112.

Figure 3:
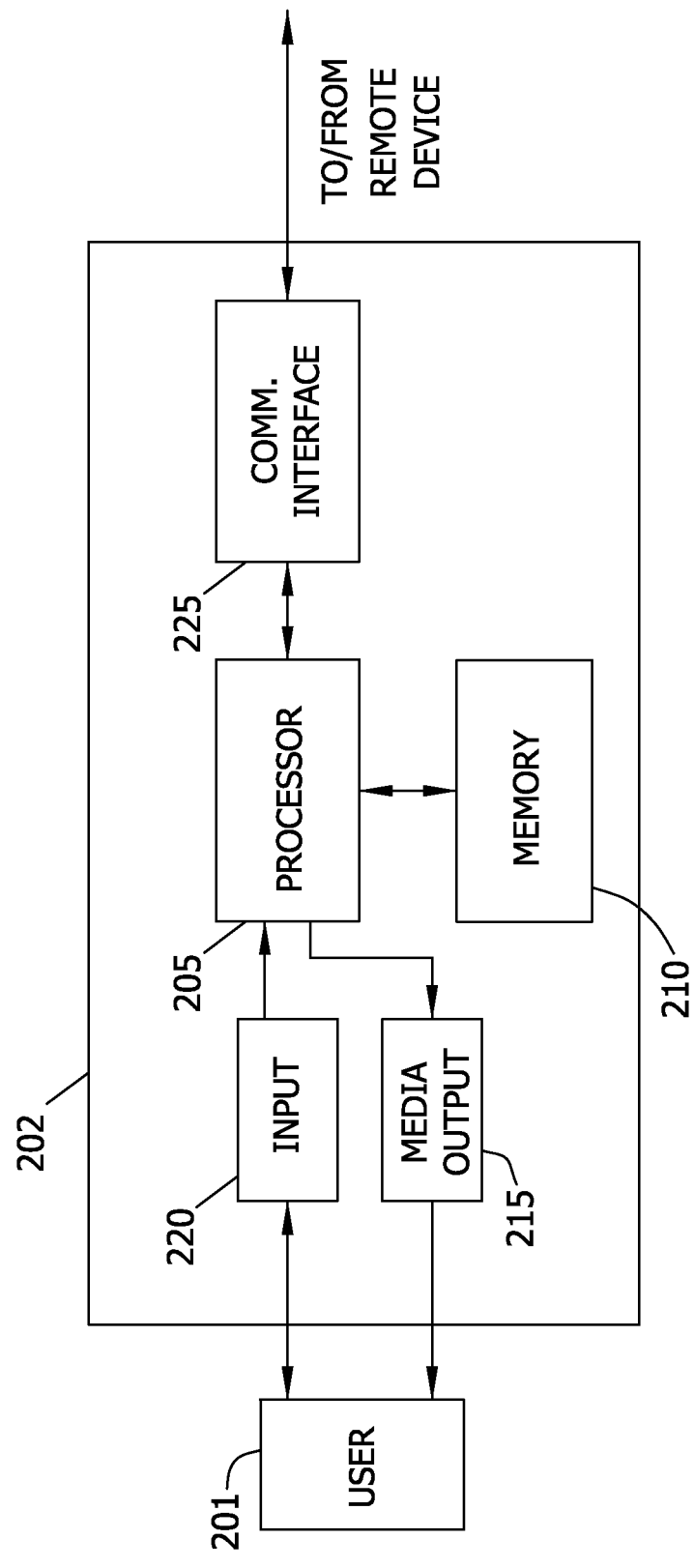

FIG. 3 illustrates an exemplary configuration of a computer device 202 operated by user 201 such as client systems 114 (shown in FIGS. 1 and 2). User's computer device 202 may include, but is not limited to, client systems 114, workstations 138, 140, 142, 146 and 154, and mobile device 158.

Computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

Computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, computer device 202 includes an input device 220 for receiving input from user 201. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

Computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 4:
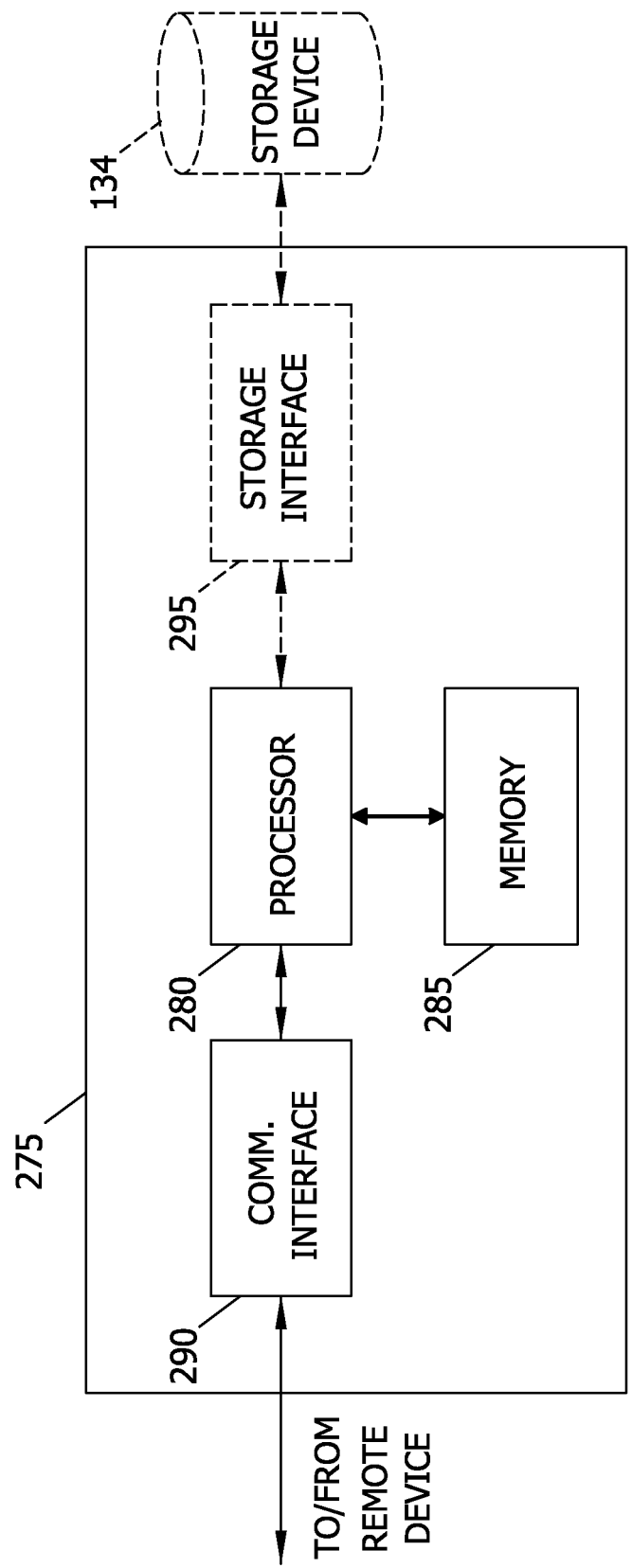

FIG. 4 illustrates an exemplary configuration of a server computer device 275 such as server system 112 (shown in FIGS. 1 and 2). Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as computer device 202 or another server computer device 275. For example, communication interface 290 may receive requests from client systems 114 via the Internet, as illustrated in FIGS. 1 and 2.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory areas 210 and 285 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
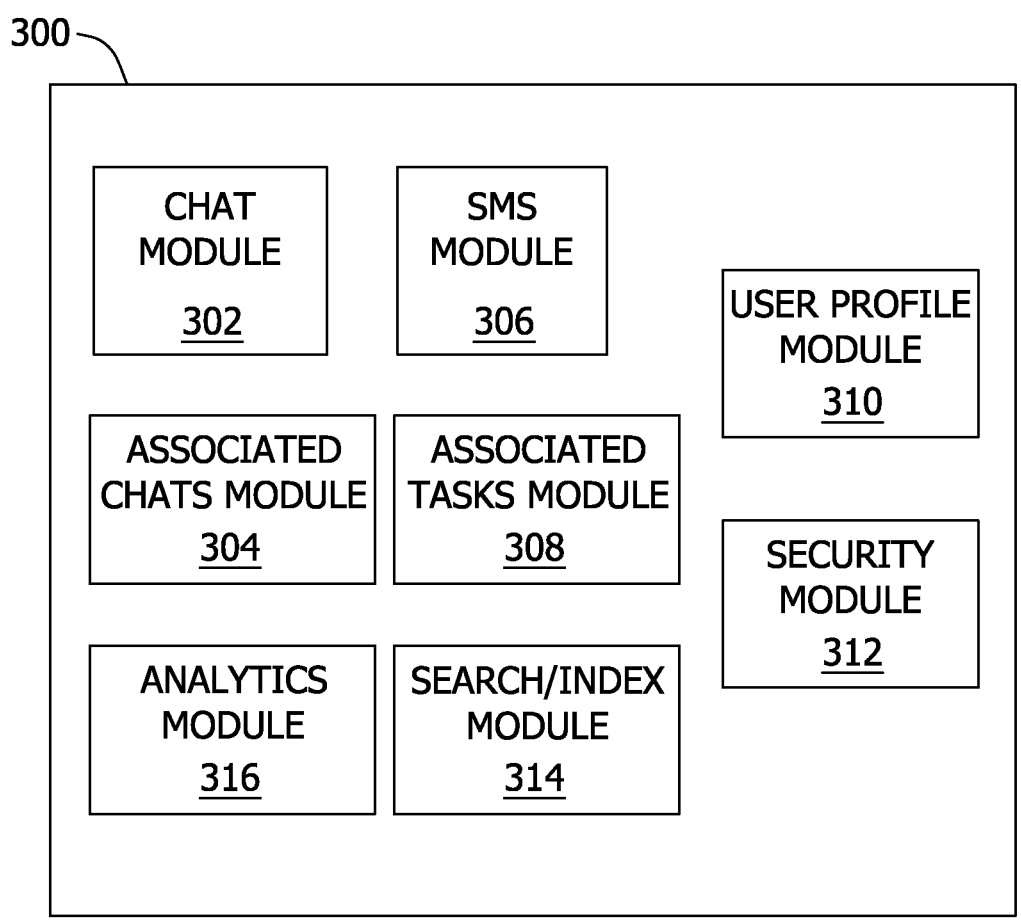

FIG. 5 is a functional block diagram of an exemplary chat system 300 according to the present disclosure. System 300 is illustrated in FIG. 4 in terms of functional modules. Although not illustrated in FIG. 5, the structure of system 300 may include a chat server, such as server 112. The chat server may be configured, such as via instructions stored in memory device 121, to facilitate chat communications in the manner hereinafter described. Further, one or more functional modules of system 300 may be located on a device, such as client system 114, remote from the chat server.

As shown in FIG. 5, system 300 includes several functional modules. A chat module 302 permits chat communications between client systems. An associated chats 304 module provides relationships between individual chats and/or groups of chats. An SMS module 306 allows participation in a chat via short message service (SMS). Task lists may be associated with one or more chats via an associated tasks module 308. A user profile module 310 contains data about one or more client/user. A security module 312 enables restrictions on access, participation, modification, etc. of, among other things, chats. Searching of chats is enabled by a search/index module 314, while analytics module 316 permits analysis of chat data. Although shown separate in FIG. 5, the modules may be integrated with one another (e.g., as a single program). The various modules will be described in more detail hereinafter.

In the exemplary system 300, chat module 302 permits client systems, such as client systems 114, to communicate with each other via the chat server. The chat server is programmed to enable users to textually converse (e.g., in full duplex mode) with other users. A chat client, including a user interface, allows the user to participate in chat communications. For example, users can communicate by typing messages into their respective chat client data entry fields. Each chat client's user interface displays the messages of each party, with an indication of the identity of the user who sent the message. Chat messages may be threaded or unthreaded. Unthreaded messages are displayed in chronological order regardless of what, if any, message the messages are responding to. Threaded messages are linked by conversation.

Chat messages may be created in any suitable mode. For example, a user may input a message and select to display the message to all authorized members immediately upon sending the message. Such a message may be fixed and unchangeable. Alternatively, a message may be created in wiki mode. In wiki mode, a message can appear to be edited by the members of a chat room. Behind the scenes, the message to be edited is automatically copied into a message area where it can be edited and then upon submission, the latest version is shown to the members and the other versions are hidden.

The chat client may be located in the client system or may be located remotely from, but accessible by, the client system. For example, the chat client may be located in the chat server or another server. The chat client may be, for example, a standalone software product, may be integrated in another software product, and/or may be accessed via a website.

The user interface presents numerous features to a user. A user participates in a chat room via the user interface. The user may enter a chat room via the user interface and view the communication contained in the chat room via the interface. The user also transmits communication to the chat room via the user interface. The user interface may include tabs for various options available to the particular user. The tabs available to a particular user may differ from other users based on, for example, what chat rooms the user belongs to and the security authorizations of the user. User interface may include tabs for the user's current available chat rooms, personal profile, documents, and groups to which chat rooms may belong. The user interface may include an organization directory organized to show the presence or absence of other users of the system and visual cues for the time zones in which the other users are located. A user's personal profile, enabled by user profile module 310, contains profile information about the user. The information can include, for example, the user's expertise, position, location, contact information, groups to which the user belongs, and any other personal information.

In some embodiments, user profile module 310 also contains grouping information about the users of system 300. A group is a uniquely identified name to which a number of individuals or other groups can be added. Other objects can be attached to a group including, for example, a list of resources, a form, a work process, a document, or any other object. Groups can share objects with other groups and play different roles in objects to which it may or may not be attached.

In some embodiments, groups are organized along a set of attributes and differentiated from other groups depending on the values of these attributes. Users who are authorized by an administrator can define these attributes. For example, a group may include users who are police officers. Police groups, or subgroups, may further be defined based on location, e.g., city, town, region state, the type of police. Other indices could be, but are not limited to, level of expertise and status/condition at that point in time. A group's attributes list is user determined Different groups may have completely different attribute lists and attributes or share some of them with other groups. Generally, an attribute for a group is a record or a set of records contained in an online editable form.

Multiple records, documents, forms, etc. may be attached to a group. The records may be updated directly or from an external system. These records can be Global, Local or Mixed Mode. Global records are records in a group that are accessible for view and or edit to all groups in a particular set of chat rooms and/or in all chat rooms for the organization. Local records are available only to the group to which they belong. The mixed mode allows records in one group to be shared selectively with other groups. This resource inventory can be requested by any other group via their chat room, through a task assigned to the group, and/or via a work flow and approval process. In some embodiments, these requests populate forms specific to the type of resource or to the group. In some embodiments, external standardized forms, such as from the Department of Homeland Security, FEMA, National Incident Management System, etc., may be automatically filled out with group and/or resource information. In some embodiments, system 300 may automatically share the filled standardized forms with other groups, users, external parties (such as the Department of Homeland Security), etc.

In an example embodiment, one type of resource inventory is a listing of one or more types of user in a group. For example, a resource inventory may include the group members that are Data Base Administrators (DBAs) in the group. These DBAs may be further divided by other attributes. For example, the DBAs may be inventoried by various levels, the type of database in which they specialize, the applications they are assigned to, etc. The attributes need not be hierarchical or even related. In this case, the inventory includes the sum of the people with the same attributes.

SMS module 306 permits a user to participate in a chat room via short message service (SMS) integration. A mobile device capable of SMS communication, such as a mobile phone, is attached to a chat room. Every message in the chat room will be sent, via SMS, to the phone and every reply from the phone placed in the chat room. Different levels of security are selectable via SMS module 306 and/or security module 312. In one example, a passkey message is sent, via SMS, to a predetermined phone number to enable the connection. SMS is typically limited to 160 characters per message. Messages longer than 160 characters may be sent as multiple messages. To assist with managing SMS integration, the chat client user interface may include two chat boxes: a small 160 character area and a larger rich text area. If it is known that one or more member of a chat room is participating via SMS, a user may decide to type a message in the smaller 160 character chat box. Alternatively, even if it is known that other members are participating via SMS, a user may type a message in the larger rich text chat box. A message larger than permitted by SMS may be split up by SMS module 306 and formatted for SMS transmission by the chat client or the chat server. Further, a chat room may have its attributes set to limit the particular chat room to either one of the two chat boxes or to have both by default. Additionally, or alternatively, the larger rich text chat box may have a visual indicator that the 160 character limit is reached.

In the exemplary system 300, the chat client permits the user to create a chat room in which chat communications may take place. When the user creates a chat room, the user can select the attributes, or parameters, of the chat room. In some embodiments, the user may create the chat room based, completely or partially, on a template chat room or on an existing chat room. The user may, optionally, modify the parameters of the chat room inherited from the template or existing chat room. Additionally, or alternatively, some attributes of a created chat room may be established by a system administrator. Such administrator established attributes may be unchangeable by the user who created the chat room or, as determined by the administrator, may be changeable by the user. For example, an administrator established attribute may permit the system administrator to view, delete, archive, modify, etc. all chat rooms.

The attributes of the chat room that may be selected by the user can include, for example, the security settings for the chat room, and/or the associations (or relationships) of the chat room.

Security module 312 includes security settings such as, for example, identification of who can participate in the chat room, who can moderate the chat room, who can change the attributes of the chat room. Selections of individuals for particular roles or levels of access with respect to the chat room may be done on an individual basis or by groups of individuals. For example, the user may individually select particular individuals who may participate in a chat room. Alternatively, or additionally, the user may select a group of individuals to be allowed to participate in the chat room. The group may be a predefined group of individuals, such as individuals A, B, and C, or the group may be defined by one or more characteristics of individuals, such as all individuals located in a particular geographical location, at a particular management level, or having a particular expertise. Selection of groups and individuals may be combined and the roles assigned to each may differ. For example, individual A may be selected to have the same rights as the user who created the chat room, while individual B and a predefined group G are permitted to participate in the chat room. Further, members of group G who have a particular characteristic (e.g., a particular management level) may be permitted to invite and permit other individuals and/or groups to participate in the chat room.

Associated chats module 304 and associated tasks module 308 permit associations of chat rooms. The associations can include its relationship to other chat rooms, and/or its association with one or more tasks, checklists or other items. Each chat room may be associated with one or more other chat rooms in a hierarchical relationship. This hierarchical ordering may be described in familial terms. For example, a chat room may be a parent chat room, a child chat room, or a joint parent. The relationship association may be a default relationship that may be unchangeable or may be a changeable association. For example, a secondary chat from may be created from a primary chat room as a child of the primary chat room. If the system is configure to allow the relationships to be changed, the secondary chat room's relationship to the primary may be changed to a parent of the primary chat (which then becomes a child of the secondary), or to a joint parent with the primary chat. Additionally, a child chat room can also sever the relationships it has with a parent chat and become a completely independent chat. A parent chat or a child chat can have any number of child chats or parent chats. The initial relationship of a chat room to other chat rooms may be a default relationship based on the configuration of the system. For example, if a new chat room is created from an existing chat room, the new chat room may, by default, by created as a child of the existing chat room. Similarly, the default may be selected to be every new chat room begins as an independent chat room with no relationship to any other chat room.

In some embodiments, associated chats module 304 links chat rooms by their associations with other chat rooms. Thus, a user may view, at least the existence of, other chat rooms to which a particular chat room is related, although the user may not be authorized to participate in, or view the contents of a particular chat room to which it is related. Further, the visibility of the hierarchical structure may be limited. For example, system 300 may be configured such that a member of a particular chat room may only be able to view its immediate parent chat room(s) and its own child chat room(s). Other configurations may limit visibility to its own generation (its siblings), only chat rooms descending from it, only chat rooms from which it descended, or only particular selected chat rooms. Alternatively, or additionally, visibility of a chat room may be a selectable attribute, such that a user may decide, when creating a chat room, to whom, or pursuant to what rules, the relationship created chat room will be visible.

For example, a first group in a chat room may invite a second group to join the chat room. The first group may select the level of access and structure provided for the second group. The second group may be added to the first chat room and both groups function together in the chat room. Additionally, a second private chat room may be created for the second group. Creating a private chat room for the second group permits the second group to communicate amongst itself without the first group being involved, or even being able to see, the communication. Alternatively, the second group may not be added to the chat room. Instead, a side chat room associated with the first group's chat room may be created. In such a creation, the members of the second group will generally not be able to communicate in the first group's chat room. If the second group was already a member of a chat room, the newly created chat room may be associated with the second group's original chat room as a side chat. If the second group is already in an existing chat room, the existing chat room may be added as a side chat to the first group. Although added as a side chat to the first group's chat, the second group's existing chat room may also remain as an independent chat room, fully capable of adding its own side chats.

Generally, a message that is entered in a chat room has as its default destination the chat room itself. In some embodiments of the present disclosure, chat messages may include multiple destinations. Thus, intergroup communications may take place to and from the chat room associated with a group. The multiplicity of destination is first at a group level. The destination may be any other group that may or may not share any other attribute with the originating group. The level and type of communication allowable can be set up a priori. The communication can be between chat rooms in either direction or one direction. The communication may also take place with forms that belong to one or more groups.

The inter-chat communications can also be set up to meet the security and efficiency needs of the multiple groups. For example, all messages in a first group's chat room can be set to be visible to a second group. An alternative setting includes a chat message only being visible to both the first and second groups when such visibility is selected at the time of transmission of the message. The responses of the either group to messages originating in either group can be controlled and threaded to the first message, if desired. When messages are sent by an originating group to multiple responding groups, the response messages in responding groups' chat rooms can be selected to be visible only to that particular responding group to provide a threaded discussion for the responding group. If desired, that responding group may then transmit a response to the originating group's message. This response may be visible to only the originating group, the originating groups and the responding groups, only some of the originating and responding groups, etc. depending on the system settings.

For example, a message sent to two groups from an originating group will appear in all three groups' chat rooms. The replies from the originating group will be threaded into the originating message. Optionally, either through an admin set up at creation or by selection at the time the originating message is sent, responses from the recipient groups may also appear in the thread for the originating group, much as a reply from the originating group itself In each recipient group's chat room, the members will be able to maintain an independent thread and send a response back only when they choose to do so. This allows a group to privately consider a response with messages that are not visible to the originating group.

Further, a message received by a responding group from an originating group can be selectively sent on to a second responding group. The response from the second responding group can appear as a thread in both or one of the first responding group and the originating group. Thus, if desired, the first responding group may filter messages from the originating group before they are sent to the second responding group. System 300 also allows the response from the second responding group to be filtered by the first responding group or to be immediately visible to the originating group, as selected.

Messages in a chat room may be sequestered from one or more members of the group. For example, a group member may send a message to a responding group. If sequestration is selected, the message will be visible only to the sender and to responding group(s). Similarly, responses from the responding group can be set to be private for the recipient or visible to all in the originating group. Optionally, the responding groups can select that both the original private message and the responding group's response be visible in the originating group. Thus, a full set of options is available for communications between groups. Any group can take on the role of the originating group and can set up multiple responding groups.

In some embodiments, chat rooms are linked by associated task module 308 to one or more task or checklist. A check list or SOP describes, assigns and monitors actions and the order of actions to be carried out and completed by a specific person or a team or teams. Check list items can be simple one-step or complicated multistep processes with complex rules for proceeding. In the case of multistep tasks, separate secondary chat rooms can be established, if needed, for each step. The basic information for each task can include, for example, times for start, completion and any other interim activity, person/group expected to perform the task, who has authority to assign or reassign the task, and who needs to be informed on completion. This information is viewable in the chat room(s) with which the task is associated. A chat room can be associated with any task list or check list. Such a chat room deals with the specifics of the task. A chat room may be associated with multiple check lists and tasks. One or more of the check lists of tasks associated with a chat room may be associated with one or more other chat rooms as well. For example, a parent chat room may be associated with multiple tasks lists. Child chat rooms of the parent may each be associated with one or more of the task lists. Depending of the selected configuration of the system, the parent chat room and other related chat rooms may have the ability to view the status of the task(s) associated with a child chat room and enter content into the task chat room. Further, the task lists and/or checklists are viewable and editable independent of the chat room. Updates, such as changes to a particular task, changes to the status of a task, etc., made to the task list separate from the chat room may post status updates to the chat room(s) with which it is associated.

One or more tasks may be used as a template or SOP for a particular type of occurrence. These SOPs can then be used to kickoff tasks that are required for particular type of incident or goal. Thus, when an incident occurs, a new task list and group of associated chat rooms need not be created independently. Instead, the SOP for that occurrence may be selected and the predetermined task list and chat room(s) may be automatically created.

Use of templates may aid organization when an event is planned to take place and/or when an unexpected event occurs. Examples of such events include, without limitation, impending weather emergencies, hosting VIPs who need security protection, an explosion or a chemical leak from a train derailment or on the highway, a fire, an earthquake, a terrorist attack, a hurricane, etc. Multiple templates may be created to deal with situations an organization or a set of organizations may encounter.

Generally, a template is a predetermined and digitized action plan. The template includes an indication of which teams, or groups, are needed to respond to the particular situation for which the template is designed and a list of the chats that will be needed. The group(s) that will be involved in the response will become members of one or more of the created chats and will communicate with each other in the chats. Also associated with these chats are tasks to be completed with timing in terms of hours/days from launch. Further identification of the person or group responsible for each task and details about each task are also included. Any documents and/or notes that may be needed by the groups during a response are assigned to and associated with the appropriate chat. In some embodiments, the templates may also include work processes associated with one or more chat. Work processes include complex tasks that may require multiple approvals and/or inputs.

Upon occurrence of an event, the appropriate template is launched. Upon launch, the chats, tasks, documents, etc. described above are created. The members of teams included in the response are notified of the launch. Notification may be accomplished by any suitable communication including, for example, by email, by telephone message, by SMS, etc. Upon launch a list becomes available immediately with all the people who will need to be involved in the response.

Data concerning the event response chats, is stored to provide an auditable chain, which may be used in post mortem reviews in order to improve the response process. Further, in some embodiments, templates may be launched in a drill mode or a real mode. The drill mode allows teams to use the system in drills. In drill mode, each message, webpage, transaction, etc. is labeled DRILL to facilitate reducing the likelihood of confusion among the team.

Attributes of a chat room may be based on the relationship of the chat room to other chat rooms. For example, depending on the configuration of the system, a child chat room may inherit its security attributes from its parent directly or according to one or more rule. Thus, all users who are communicating members of a parent chat may be authorized as communicating members of the child chat. Alternatively, the child chat may include only members who are members of the parent chat who also have a particular attribute. In other embodiments, the attributes of a chat room may be independent of the attributes of the parent chat room.

Although communication via chat rooms is generally discussed herein as text communication, the communication via chat rooms in the present disclosure may include other communication. An entry of content may consists of short messages, long messages, and complex messages. The communication may include other items (e.g., word processing files, images, sound files, spreadsheets, etc.) transmitted via a chat room. The other items, generally referred to herein as attachments, may be attached to a communication or may be separately transmitted. The attachments are visible to the chat room to which they were added and with access control options, available to all chats or a subset or specific people or specific roles. Many other objects can be added to a chat. Among these are surveys and polls, forms and workflows, projects, documents, and notes. Communication between objects is available as is the conditional and unconditional triggering of other objects from one or more objects.

Any object assigned to a group or to a chat room can have the same functionality described herein for chat messages. For example, as task can be assigned from an originating group to one or more responding groups. A document can be sent in the same way. Such objects need not have a response requirement. In some instances, only a message response will be possible, and then only if permitted by the originating group.

An approval object is a type of task that requires a specific approval from a person or a group. An approval object can be attached just to a person or to a group or to a person or group in a chat room.

An originating group chat room can request a resource from a responding group. The resource can be an object or a person. Records of a group's resources may be stored in a form. Similarly a form, or a field in a form, may indicate the number of objects of a particular type are assigned to a group. These objects may be defined by one or more attributes. The resource objects may be set up to be controlled or free. If set as free, another group can take the object without getting any permission. A controlled object requires approval of the originating group, or a member of the originating group, before the object may be acquired. Variations and combinations of free and controlled settings may be applied to a resource object. For example, a resource object can be set up to be fully free to all groups/users or controlled to some groups and free to others. Further, a resource object may be designated as free to specific people in a group, but controlled to everyone else.

As described above, chat rooms in the exemplary system are persistent and the chat rooms and their communications remain beyond a particular chat. Accordingly, in some embodiments additional features and analysis are available; including text searching, chat analytics and history.

Search/index module 314 makes searching available to users of exemplary system 300. Text of chats occurring in chat rooms may be indexed continuously. Thus, a user may search the text of chat room communications, whether the communication is a current conversation or one which occurred in the past. Similarly, attachments may be indexed so they may be searched for by users. A search may be restricted by key words, particular users, particular groups of users, particular chat rooms or by any other suitable criterion.

System 300 includes many types of analytics provided by analytics module 316. A first type of analytic offered covers basic statistics concerning a chat room. These may include, for example, how long, how much traffic, duration of stay in chat, time between inputs, and the participation by individuals. A second type of analytic provides a chronological view of all participation across all chat rooms by a specific user. In a further type of analytic, the inputs (e.g., chat communications) of a user are considered as a reflection of the user's expertise and a list of key words is developed to differentiate that particular user from other users. The connections between users who are involved in the same chat room may also be analyzed. Over a period of time the connectivity of that user with respect to other users of the system may be established. The extent of such user's participation in chat rooms and chat interactions with other users may help establish the weight to be given to the user's interactions.

System 300 provides historical information to users. Each user can see all the chat rooms in which the user has participated or been invited to participate. Further, subject to security settings for the system and the individual chat rooms, the user may view chat rooms belonging to anyone. These past chat rooms may be viewed and additional comments added at any time. The chat rooms may be sorted by time, subject, participant and subject and any of the other parameters used to define the chat room.

In the exemplary system 300, chat communications take place in spaces that persist over time. These spaces may map to an organization/team/function/project etc. This obviates the recreation of the characteristics of that space's chats each time they are initiated. These persisting spaces are the repository for archived and template chats.

In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 205, 280 including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein a technical effect is associating a first chat room of a plurality of chat rooms with a first element and facilitating chat communications between a plurality of users of the chat rooms. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer system for hosting electronic group chat, the computer system comprising:
   a memory device for storing data; and
   a processor coupled in communication with the memory device, said processor programmed to:
      electronically host a plurality of chat rooms;
      associate a first chat room of the plurality of chat rooms with a first element inputted into the computer system, wherein the first element comprises one of a task, a task list, a work process, a document, and a record;
      transmit chat communications between a plurality of users of the chat rooms;
      selectively link separate conversations in the chat rooms into separate threads;
      assign, in response to an input from a user of the first chat room, the first element to a user who is not a user of the first chat room; and
      display chat communications associated with the first element in the first chat room and in association with the first element, wherein a plurality of chat messages of the chat communications are linked in at least one thread.

2. A computer system in accordance with claim 1, further comprising associating the first chat room with a second chat room of the plurality of chat rooms.

3. A computer system in accordance with claim 2, wherein said processor is programmed to hierarchically order the first and second chat rooms.

4. A computer system in accordance with claim 1, further comprising associating the first chat room with a mobile device, and wherein the processor is programmed to transmit text communications received in the first chat room to the mobile device.

5. A computer system in accordance with claim 4 and wherein the processor is programmed to receive the communication from the mobile device and present the received communication in the first chat room.

6. A computer system in accordance with claim 1, wherein the processor is further programmed to store data associated with the plurality of chat rooms in said memory device, wherein the stored data includes at least one of text communications, chat communications, task lists, and file attachments.

7. A computer system in accordance with claim 6, wherein the processor is further programmed to index the stored data.

8. A computer system in accordance with claim 7, wherein the processor is further programmed to permit a user to search the indexed data.

9. A computer system in accordance with claim 6, wherein the processor is further programmed to analyze the stored data and provide results of the analysis to a user.

10. A method of providing electronic group chat communications, the method comprising:
    electronically hosting a plurality of chat rooms;
    associating a first chat room of the plurality of chat rooms with a first element, wherein the first element comprises one of a task, a task list, a work process, a document, and a record;
    transmitting chat communications between a plurality of users of the chat rooms;
    selectively linking separate conversations in the chat rooms into separate threads;
    assigning, in response to an input from a user of the first chat room, the first element to a user who is not a user of the first chat room; and
    displaying chat communications associated with the first element in the first chat room and in association with the first element, wherein a plurality of chat messages of the chat communications are linked in at least one thread.

11. A method in accordance with claim 10, further comprising associating the first chat room with a second chat room of the plurality of chat rooms, and hierarchically ordering the first and second chat rooms.

12. A method in accordance with claim 10, further comprising associating the first chat room with a mobile device, transmitting communications received in the first chat room to the mobile device, receiving communications from the mobile device, and presenting in the first chat room the communications received from the mobile device.

13. A method in accordance with claim 10, further comprising storing data associated with the plurality of chat rooms in said memory device, wherein the stored data includes at least one of text communications, chat communications, task lists, and file attachments.

14. A method in accordance with claim 13, further comprising indexing the stored data and permitting a user to search said indexed data.

15. A method in accordance with claim 13, further comprising analyzing the stored data, and providing results of said analysis to a user.

16. A computer system for hosting electronic group chat, the computer system comprising:
 a memory device, said memory device storing a response template for an event, the response template comprising an action plan for responding to the event, the action plan including identification of a group and at least one task, the group including a plurality of members; and
 a processor coupled in communication with the memory device, said processor programmed to, upon initiation of a response based on the response template:
  notify a member of the group that a response to the event has been initiated based on the template;
  create at least one electronic chat room;
  assign the plurality of members of the group to the electronic chat room;
  associate the at least one task with the electronic chat room;
  transmit chat communications between the plurality of members of the group assigned to the electronic chat room;
  assign, in response to an input from a member of the group assigned to the at least one electronic chat room, the task to a user who is not a member of the group assigned to the at least one electronic chat room; and
  display chat communications associated with the first element in the at least one electronic chat room and in association with the task, wherein a plurality of chat messages of the chat communications are linked in at least one thread.

17. A computer system in accordance with claim 1, wherein the processor is further programmed to create a second chat room associated with the first chat room and at least a portion of the first element, and wherein communication in the second chat room is displayed in both the second chat room and the first chat room.

18. A computer system in accordance with claim 1, wherein communications associated with the first element in the first chat room comprise text communications directed at the first element and changes to the first element by a user.

19. A method in accordance with claim 10, further comprising creating a second chat room associated with the first chat room and at least a portion of the first element, and displaying communication in the second chat room in both the second chat room and the first chat room.

* * * * *